United States Patent [19]
Elder et al.

[11] Patent Number: 5,605,312
[45] Date of Patent: Feb. 25, 1997

[54] UNIVERSAL HOLDER

[76] Inventors: Derek Elder; Minta Elder, both of 309 Dakota Dr., Ellsworth AFB, S. Dak. 57706

[21] Appl. No.: 511,995

[22] Filed: Aug. 7, 1995

[51] Int. Cl.⁶ ............................. A47B 96/06
[52] U.S. Cl. .................. 248/230.7; 248/229.26
[58] Field of Search ............... 248/230.7, 214, 248/229.16, 229.25, 227.4, 228.7, 231.81, 316.7, 205.2

[56]  References Cited

U.S. PATENT DOCUMENTS

| | | | |
|---|---|---|---|
| 4,063,701 | 12/1977 | Wray | 248/293 |
| 4,548,326 | 10/1985 | Danna et al. | 211/71 |
| 4,660,792 | 4/1987 | Rogalski | 248/205.2 X |
| 4,712,693 | 12/1987 | Striplin | 211/164 |
| 4,795,211 | 1/1989 | Stern et al. | 297/194 |
| 4,815,683 | 3/1989 | Ferrante | 248/309.1 X |
| 4,863,134 | 9/1989 | Young et al. | 248/311.2 |
| 4,911,389 | 3/1990 | Self | 248/205.2 X |
| 5,020,755 | 6/1991 | Frankel | 248/227.4 X |
| 5,127,615 | 7/1992 | Jones | 248/205.2 X |
| 5,192,042 | 3/1993 | Wotring et al. | 248/205.2 X |
| 5,238,212 | 8/1993 | Dechellis | 248/311.2 |
| 5,305,980 | 4/1994 | Le Blanc | 248/309.1 |
| 5,356,107 | 10/1994 | Sinohuiz | 248/311.2 |

*Primary Examiner*—Ramon O. Ramirez
*Attorney, Agent, or Firm*—Gene R. Woodle

[57]  ABSTRACT

Embodiments of a universal holder are disclosed which may be removably attached to the horizontal or nearly horizontal member of an exercise machine or similar object. A remote control unit may be removably attached to the top of the universal holder and held in a convenient and accessible position for use by persons using the exercise machine or similar object. A holder is also provided which may hold a beverage, cellular telephone, or similar object in a convenient and secure position.

5 Claims, 2 Drawing Sheets

UNIVERSAL HOLDER

BACKGROUND OF THE INVENTION

1. Field of the Invention

The present invention relates generally to the field of holders to support and hold objects at a convenient location; and, more particularly, relates to such holders which may be attached to the horizontal frame of an exercise machine, chair, or the like to support a remote control unit and cellular telephone or similar object.

2. Background Information

It is common to have a television set, compact disc player, video cassette recorder, or similar electronic device which has a remote control unit which operates one or more of these devices from a remote location. Such remote control units ordinarily include a plurality of pressure or touch sensitive keys which, when pressed, activate, change, or modify one or more of the features of such electronic devices. A remote control unit may, for example, be used to change the channel on a television set remotely by pressing one or more keys on the remote control unit.

Many conventional exercise machines include a horizontal or nearly horizontal, tubular member which is used as a hand grip when the machine is operated or which is a part of the frame or structure of the machine. Persons using such machines often desire to watch television, listen to music, or engage in similar activities while exercising. Such activities frequently involve the use of a remote control unit. For example, a person may wish to watch television while exercising and to switch channels using a remote control unit.

Many people also find it convenient or necessary to drink a beverage, use a cellular telephone, or perform a similar activity while using an exercise machine with a horizontal or nearly horizontal, tubular member.

There are also many people who desire to use a remote control unit as well as to drink a beverage, use a cellular telephone, or perform a similar activity while sitting in a chair having a horizontal or nearly horizontal, tubular member or while using other objects having a horizontal or nearly horizontal, tubular member.

Therefore there is a need for a device or method which may be attached to an exercise machine or similar object and which will hold a remote control unit and a beverage, cellular telephone, or similar object in a secure and convenient location for use by persons using such an exercise machine or similar object.

Several attempts have been made to meet this or similar needs. One such attempt is disclosed in the patent to Wray (U.S. Pat. No. 4,063,701, Dec. 20, 1977). This patent discloses a device for attaching to a chair and holding a beverage. This holder includes a circular clamp which may be attached to a vertical support member on a lawn chair just beneath the armrest. An arm with a circular opening slightly larger than the usual beverage container at the end furthest from the chair is attached to the clamp such that the arm may either be locked in a horizontal position for use or folded down parallel to the vertical support member for storage. A flexible net is attached to and hangs down from the circular opening in the arm. This net is open at the bottom, but the opening at the bottom is significantly smaller than the circular opening in the arm. A beverage may be placed within the circular opening and is held in place by the net.

Another such attempt is disclosed in the patent to Stripling (U.S. Pat. No. 4,712,693, Dec. 15, 1987). This patent discloses a "U" shaped base which may be attached to a chair etc. A three-sided, prism shaped, holder is attached by its ends to the arms of the "U." Three different remote control units may be attached to the three faces of the prism. The three remotes may be accessed by rotating the prism.

Another such attempt is disclosed in the patent to Young et al. (U.S. Pat. No. 4,863,134, Sep. 5, 1989). This patent discloses a combination cup holder and armrest. This holder includes a rectangular, hollow tube with an open bottom which acts as an armrest. The holder also includes an annular opening at the end opposite the armrest which may be used to hold a beverage container. The open bottom of the armrest portion of the holder may be pressed down over the arm of a chair such as a theater or stadium seat to hold the armrest and the beverage holder in place.

SUMMARY OF THE INVENTION

The universal holder of the instant invention solves the problems in the prior art by providing a device which may be attached to an exercise machine or similar object and which will hold a remote control unit and a beverage, cellular telephone, or similar object in a secure and convenient location for use by persons using such an exercise machine or similar object. The device in general includes a base which may be securely attached to a horizontal or nearly horizontal member of an exercise machine or similar object. Means for temporarily attaching a remote control unit are provided on the top of the base and means are also provided for holding a beverage, cellular telephone, or similar object in a secure and convenient position.

One of the major objective of the universal holder is to provide a device which may be attached to an exercise machine or similar object and which will hold a remote control unit and a beverage, cellular telephone, or similar object in a secure and convenient location for use by persons using such an exercise machine or similar object.

Another objective of the universal holder is to provide a method of attachment which is secure and will not allow the universal holder to rotate or slip once it is secured.

Another objective of the universal holder is to provide a device which is inexpensive, lightweight, and simple to use.

These and other features of the invention will become apparent when taken in consideration with the following detailed description and drawings.

DESCRIPTION OF A PREFERRED EMBODIMENT

Figure 1:
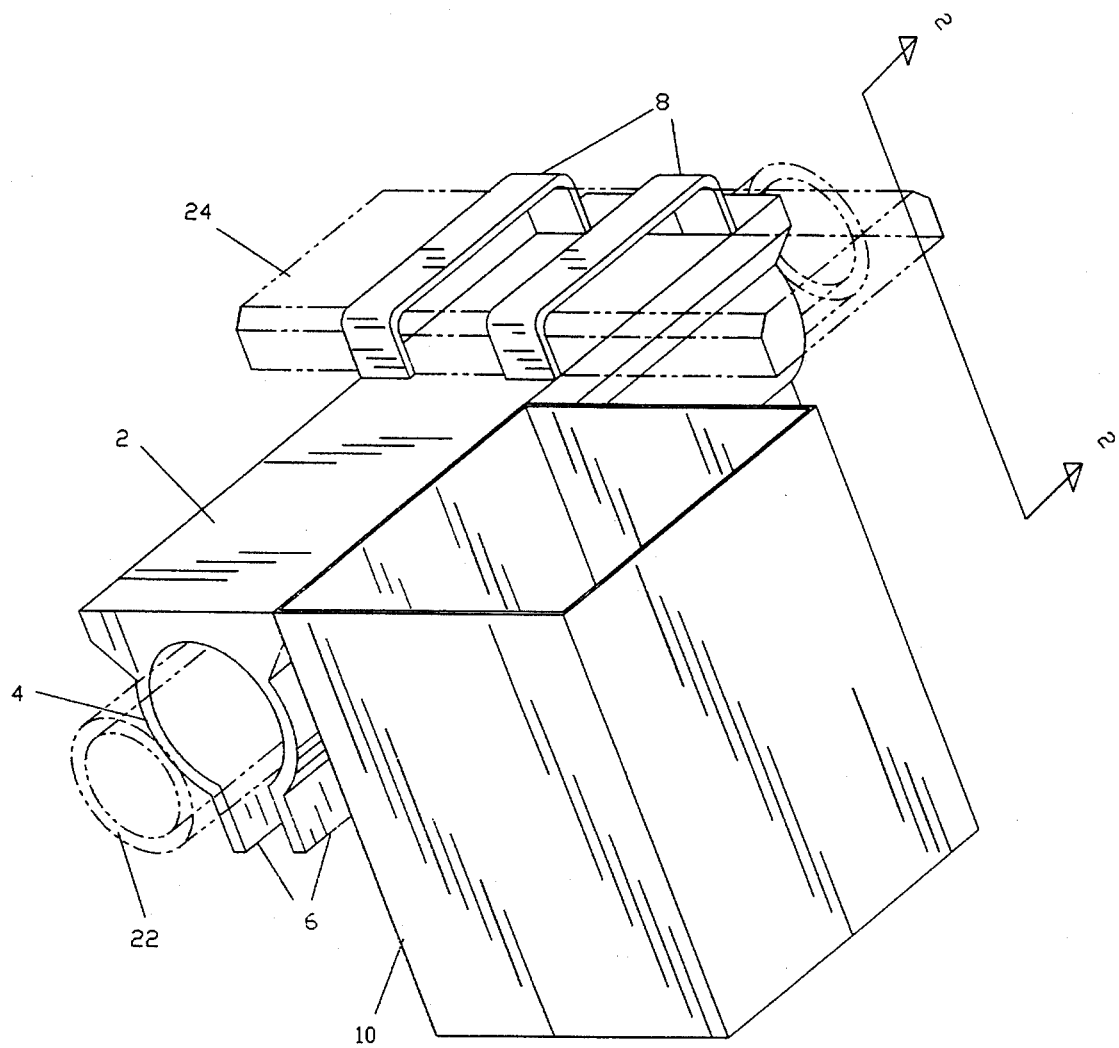
FIG. 1 is a perspective view of a preferred form of a universal holder embodying the present invention.
Figure 3:
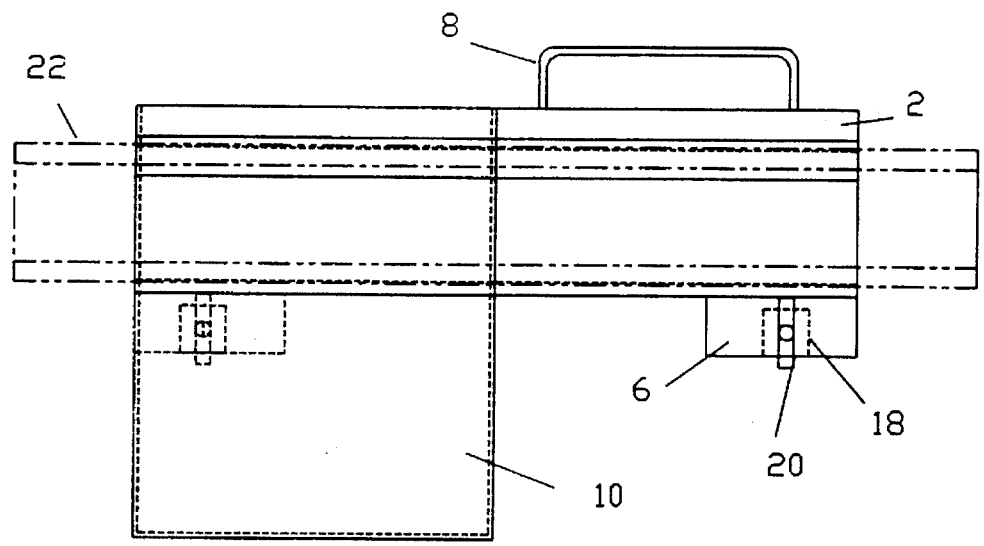
FIG. 3 is a side view of the universal holder.
Figure 2:
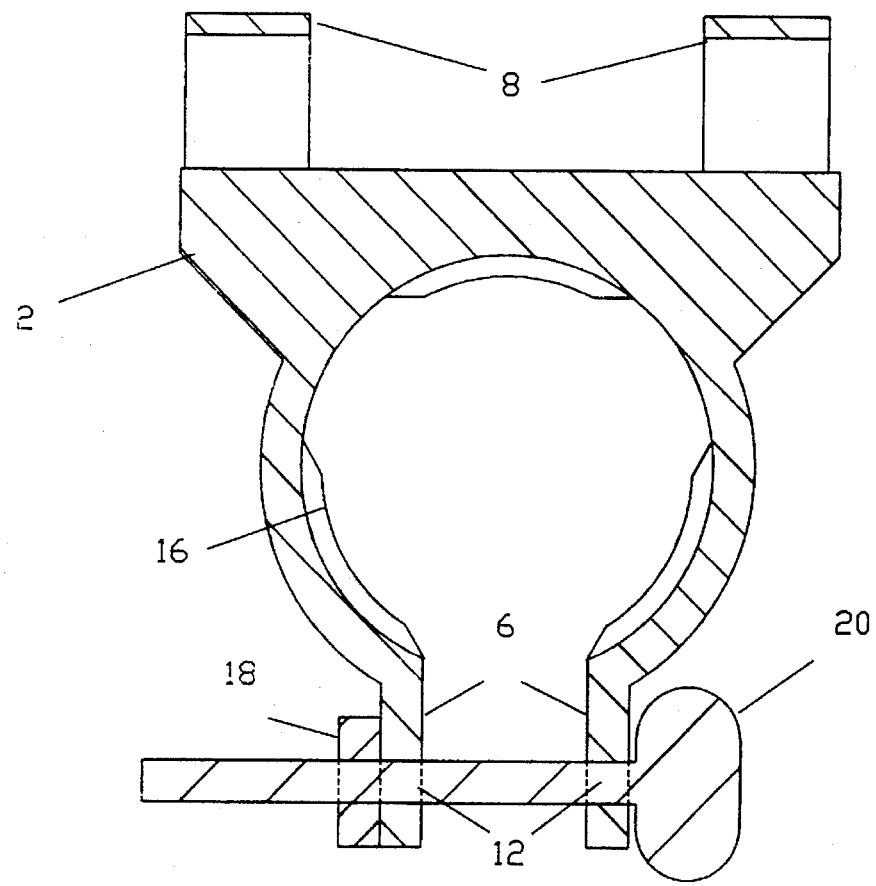
FIG. 2 is a partial sectional view of the universal holder taken along lines 2—2 of FIG. 1.

Referring to the drawings, FIGS. 1, 2, and 3, there is shown a preferred form of the universal holder embodying the present invention.

Referring to FIG. 1, there is a base 2 having a forward end and a rearward end as well as a front face and a back face perpendicular to the forward and the rearward ends. The top surface of the base 2 is flat. The bottom of said base 2 has the general shape of a hollow cylinder 4 with an opening somewhat less in width than the inside diameter of the cylinder 4 running the length of said cylinder 4. Four flanges 6 protrude vertically downward from the bottom of said cylinder 4. Referring briefly to FIG. 3, there are two of the flanges 6 at each end of said cylinder 4. Referring again to FIG. 1, the inside surface of each pair of said flanges 6 are the same distance apart as the width of the opening in the bottom of said cylinder 4.

Two straps 8 having the general shape of an upside down "U" are affixed to the top surface of said base 2. The straps 8 are affixed near the rearward end of said base 2. One of said straps 8 is affixed with the outer edge of the legs of the "U" aligned with and flush with the front face of said base 2. The other of said straps 8 is affixed with the outer edge of the legs of the "U" aligned with and flush with the back face of said base 2.

A holder 10 having the general shape of a box is attached to the front face of said base 2 near the forward end of said base 2. The holder 10 includes four sides and a bottom, but is open on the top. It is the back side of said holder 10 which is affixed to said base 2 and the top edge of the back side of said holder 10 is aligned with and flush with the top of said base 2.

Referring now to FIG. 2, there are four holes 12, one through each of said four flanges 6. The holes 12 are perpendicular to the length of said flanges 6 and each of said holes 12 is located near the center of each of said flanges 6. Said holes 12 in the forward pair of said flanges 6 are aligned with each other and said holes 12 in the rearward pair of said flanges 6 are also aligned with each other.

There are a plurality of strips 16 affixed to the inside surface of said cylinder 4. The strips 16 are no longer than the length of said cylinder 4 and run parallel to the front face of said base 2.

There are two nuts 18, one affixed to the back face of each of the said two flanges 6 nearest the back face of said base 2. The holes in the nuts 18 are aligned with the said holes 12 in said flanges 6.

There are two thumb screws 20. Each of the thumb screws 20 fits through one of the said holes 12 in one of said flanges 6 nearest the front face of said base 2 and may be screwed into one of said nuts 18.

Referring again to FIG. 1, phantom lines indicate a horizontal or nearly horizontal, tubular member 22 on an exercise machine or similar object. Said flanges 6 and said cylinder 4 may be snapped down over the member 22 such that said cylinder 4 fits around said member 22. Said thumb screws 20 may be tightened within said nuts 18 to hold said base 2 in place. The inside surfaces of said strips 16 make contact with the outside surface of said member 22. Said strips 16 allow the universal holder to be used on members of differing diameter and also provide a surface which is not likely to slip against the outside surface of member 22, thus preventing the universal holder from slipping and rotating about said member 22.

Phantom lines represent a remote control unit 24. The remote control unit 24 may be slipped inside said straps 8 and held in place at a convenient location.

A beverage, cellular telephone, or other object may be placed within said holder 10 and held at a convenient and secure location.

In the preferred embodiment of the universal holder said base 2, said cylinder 4, said flanges 6, and said holder 10 are made of any durable plastic material. The material must be of sufficient strength and rigidity to hold a remote control unit and beverage, cellular telephone, or similar object securely; but sufficiently flexible that said cylinder 4 may be pressed over said member 22. The straps 8 are made from elastic and of the approximate size to hold a conventual remote control unit; however, any other material of sufficient strength, flexibility, and resiliency including rubber and the like could be used. In the preferred embodiment of the universal holder said straps 8 are used to removably attach the remote control unit to the universal holder; however, other means such as the hook-and-loop fasteners associated with the trademark "Velcro" or adjustable straps fastened with snaps, buckles, or similar fastening means could be used. Said strips 16 are made of flexible, plastic foam; but other material having suitable flexibility, durability, resiliency and compressibility could be used. Said nuts 18 and said thumb screws 20 are conventional. All elements are attached with adhesive, but other methods of attachment could be used.

While preferred embodiments of this invention have been shown and described above, it will be apparent to those skilled in the art that various modifications may be made in these embodiments without departing from the spirit of the present invention. For that reason, the scope of the invention is set forth in the following claims:

We claim:

1. A universal holder for holding a remote control unit, said universal holder being removably attachable to a substantially horizontal member of an exercise machine or similar object, said universal holder comprising:

(1) a base having a forward end and a rearward end, a top and a bottom, a front face and a back face; the base having a flat top surface;

(2) a hollow cylinder having a top and a bottom, the top of the hollow cylinder being attached to the bottom of said base; the bottom of said hollow cylinder having an opening running the length of said hollow cylinder parallel to the longitudinal axis of said hollow cylinder;

(3) a plurality of flanges protruding vertically downward from the bottom of said hollow cylinder; the flanges being in pairs with each pair running parallel to the longitudinal axis of said hollow cylinder, with one of each pair being attached to opposite sides of the opening in the bottom of said hollow cylinder, and with each pair being aligned with each other; said flanges all having holes in the center of each flange with the holes being perpendicular to said flanges;

(4) a plurality of nuts, the number of the nuts being equal to the number of pairs of said flanges and said nuts being affixed to the rearward face of the rearward most of each of the pairs of said flanges and being aligned with said holes in said flanges;

(5) a plurality of thumb screws, the number of the thumb screws being equal to the number of nuts and said thumb screws being capable of passing through the hole in the forwardmost of each pair of said flanges and being screwed into each of said nuts; and (6) remote control unit fastening means for removably attaching a conventional remote control unit to said base such that the operating keys or buttons of the remote control unit are accessible;

whereby said flanges and said hollow cylinder may be snapped down over the horizontal or nearly horizontal member of an exercise machine or similar object and the universal holder may be secured by tightening said thumb screws within said holes, a remote control unit may be removably attached to the universal holder, and the remote control unit held in a convenient and secure position for use by a person using the exercise machine or similar object.

2. A universal holder as set forth in claim 1, in which the remote control unit fastening means comprises a plurality of flexible, stretchable straps; the straps being attached by their ends to the top surface of said base such that the length of said straps is parallel to the front face of said base and such that the ends of said straps are aligned with each other;

whereby a remote control unit may be slipped inside said straps and held securely and conveniently to the top of said base on the universal holder and the keys or buttons on the remote control unit may be accessed.

3. A universal holder for holding a remote control unit, said universal holder being removably attachable to a substantially horizontal member of an exercise machine or similar object, said universal holder comprising:

(1) a base having a forward end and a rearward end, a top and a bottom, a front face and a back face; the base having a flat top surface;

(2) base fastening means for removably attaching said base to a substantially horizontal member of a exercise machine or similar object; and (3) remote control unit fastening means for removably attaching a conventional remote control unit to said base such that the operating keys or buttons of the remote control unit are accessible, the remote control unit fastening means being located near the rearward end of said base; and (4) a holder having the general shape of a box; the holder having four sides and a bottom, but no top; the rearward most side of said holder being attached to the front face of said base near the forward end of said base such that the top edge of the rearward most side of said holder is aligned with and flush with the top surface of said base;

whereby when the universal holder is removably attached to the substantially horizontal member of an exercise machine or similar object and a remote control unit is removably attached to the universal holder, the remote control unit is held in a convenient and secure position for use by a person using the exercise machine or similar object and a beverage, cellular telephone, or similar object may be placed within said holder and also held in a convenient and secure position.

4. A universal holder as set forth in claim 3, in which the base fastening means comprises:

(1) a hollow cylinder having a top and a bottom, the top of the hollow cylinder being attached to the bottom of said base; the bottom of said hollow cylinder having an opening running the length of said hollow cylinder parallel to the longitudinal axis of said hollow cylinder;

(2) a plurality of flanges protruding vertically downward from the bottom of said hollow cylinder; the flanges being in pairs with each pair running parallel to the longitudinal axis of said hollow cylinder, with one of each pair being attached to opposite sides of the opening in the bottom of said hollow cylinder, and with each pair being aligned with each other; said flanges all having holes in the center of each flange with the holes being perpendicular to said flanges;

(3) a plurality of nuts, the number of the nuts being equal to the number of pairs of said flanges and said nuts being affixed to the rearward face of the rearward most of each of the pairs of said flanges and being aligned with said holes in said flanges; and (4) a plurality of thumb screws, the number of the thumb screws being equal to the number of nuts and said thumb screws being capable of passing through the hole in the forwardmost of each pair of said flanges and being screwed into each of said nuts;

whereby said flanges and said hollow cylinder may be snapped down over the horizontal or nearly horizontal member of an exercise machine or similar object and the universal holder may be secured by tightening said thumb screws within said holes.

5. A universal holder as set forth in claim 3, in which the remote control unit fastening means comprises a plurality of flexible, stretchable straps; the straps being attached by their ends to the top surface of said base such that the length of said straps is parallel to the front face of said base and such that the ends of said straps are aligned with each other;

whereby a remote control unit may be slipped inside said straps and held securely and conveniently to the top of said base on the universal holder and the keys or buttons on the remote control unit may be accessed.

* * * * *